(12) United States Patent
Gopalasetty et al.

(10) Patent No.: US 7,849,499 B2
(45) Date of Patent: Dec. 7, 2010

(54) ENTERPRISE WIRELESS LOCAL AREA NETWORK (LAN) GUEST ACCESS

(75) Inventors: Bhanu Gopalasetty, San Jose, CA (US); Ajit Sanzgiri, Los Gatos, CA (US); Chia Tsai, Cupertino, CA (US); Jun Xie, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 752 days.

(21) Appl. No.: 11/842,826

(22) Filed: Aug. 21, 2007

(65) Prior Publication Data

US 2009/0055900 A1 Feb. 26, 2009

(51) Int. Cl.
*G06F 15/16* (2006.01)
(52) U.S. Cl. .......................................... 726/4; 709/227
(58) Field of Classification Search ........................ None
See application file for complete search history.

(56) References Cited

U.S. PATENT DOCUMENTS

| | | | | | |
|---|---|---|---|---|---|
| 6,061,650 | A * | 5/2000 | Malkin et al. | ............... | 704/228 |
| 6,963,582 | B1 * | 11/2005 | Xu | ............... | 370/466 |
| 7,426,271 | B2 * | 9/2008 | Conley et al. | ................ | 380/33 |
| 7,574,737 | B1 * | 8/2009 | Loh | ............. | 726/15 |
| 7,725,730 | B2 * | 5/2010 | Juels et al. | .................. | 713/183 |
| 2001/0048686 | A1 * | 12/2001 | Takeda et al. | ............... | 370/401 |
| 2002/0038371 | A1 * | 3/2002 | Spacey | ........................ | 709/227 |
| 2002/0186688 | A1 * | 12/2002 | Inoue et al. | .................. | 370/352 |
| 2004/0068668 | A1 * | 4/2004 | Lor et al. | ..................... | 713/201 |
| 2005/0270992 | A1 * | 12/2005 | Sanzgiri et al. | .......... | 370/310.2 |
| 2006/0114897 | A1 * | 6/2006 | Suri | ............................. | 370/389 |
| 2006/0262736 | A1 * | 11/2006 | Dong et al. | ................. | 370/254 |
| 2008/0155252 | A1 * | 6/2008 | Nambiar | ..................... | 713/153 |

OTHER PUBLICATIONS

Hanks et al, "Generic Routing Encapsulation (GRE)", Oct. 1994, 9 pages.*
Hanks et al, "Generic Routing Encapsulation over IPv4 networks", Oct. 1994, 5 pages.*

* cited by examiner

*Primary Examiner*—Ponnoreay Pich
(74) *Attorney, Agent, or Firm*—Cesari and McKenna, LLP; Michael R. Reinemann (57) ABSTRACT

In one embodiment, detecting a wireless network access request, forwarding data associated with the detected wireless network access request to a first multipoint Generic Routing Encapsulation (mGRE) tunnel, receiving authentication information associated with the detected wireless network access request, receiving authentication status information for the detected wireless network access request, and forwarding data associated with the detected wireless network access request to a second multipoint Generic Routing Encapsulation (mGRE) tunnel connected to a predetermined internet protocol (IP) subnet when the received authentication status information includes a successful authentication, are provided.

19 Claims, 7 Drawing Sheets

ENTERPRISE WIRELESS LOCAL AREA NETWORK (LAN) GUEST ACCESS

TECHNICAL FIELD

The present disclosure relates generally to providing guest access in wireless local area networks (WLAN).

BACKGROUND

In a deployed wireless local area network (WLAN) supporting layer-3 mobility, there are three main components including Access Points (APs), Wireless Domain Service (WDS) on the Wireless LAN Service Module (WLSM), and Layer-3 Mobility Module (L3MM) on Route Processor. The Access Point (AP) in the wireless LAN is configured to provide a communication link (for example, a radio connectivity) to a Mobile Node (MN) on the wireless LAN. In addition, the Access Points (APs) also are configured for network connectivity to the wireless domain service (WDS) for control plane signaling and to the central switch (CS) to tunnel the mobile node's (MN) data traffic through the wired LAN. The control traffic is terminated at the wireless domain service (WDS) and the data traffic sourced by and destined to the Mobile Nodes (MNs) is tunneled between the Access Point (AP) and Central Switch (CS) using multipoint Generic Routing Encapsulation (GRE) tunnels (mGRE tunnels). The layer-3 mobility module (L3MM) on the router processor of the central switch is configured to handle the management of multipoint GRE tunnels (mGRE tunnels) to the access points (APs).

Moreover, in the wireless local area network (WLAN), the wireless domain service (WDS) is configured to actively interact with the layer-3 mobility module (L3MM) and the access points (APs). That is, the wireless domain service (WDS) is configured to handle the mobile node (MN) authentication and to maintain the session states for each mobile node (MN) connected to the respective access points (APs) in the wireless local area network (WLAN).

In the wireless local area network (WLAN) such as described above, it would be desirable to have method and system for configuring the central switch (CS) to provide guest access so provide substantially basic functionality for the majority of the networks to securely redirect guest traffic to, for example, a login web page, and after authentication, to securely and easily route the guest traffic to, for example, the sub-network that resides between a trusted internal network (for example, a corporate private LAN), and an untrusted external network such as the internet.

SUMMARY

Overview

A method in particular embodiments may include detecting a wireless network access request, forwarding data associated with the detected wireless network access request to a first multipoint Generic Routing Encapsulation (mGRE) tunnel, receiving authentication information associated with the detected wireless network access request, receiving authentication status information for the detected wireless network access request, and forwarding data associated with the detected wireless network access request to a second multipoint Generic Routing Encapsulation (mGRE) tunnel connected to a predetermined internet protocol (IP) subnet when the received authentication status information includes a successful authentication.

An apparatus in particular embodiments may include a network interface, one or more processors coupled to the network interface, and a memory for storing instructions which, when executed by the one or more processors, causes the one or more processors to detect a wireless network access request, forward data associated with the detected wireless network access request to a first multipoint Generic Routing Encapsulation (mGRE) tunnel, receive authentication information associated with the detected wireless network access request, receive authentication status information for the detected wireless network access request, and forward data associated with the detected wireless network access request to a second multipoint Generic Routing Encapsulation (mGRE) tunnel connected to a predetermined internet protocol (IP) subnet when the received authentication status information includes a successful authentication.

These and other features and advantages of the present disclosure will be understood upon consideration of the following description of the particular embodiments and the accompanying drawings.

DETAILED DESCRIPTION

Figure 1:
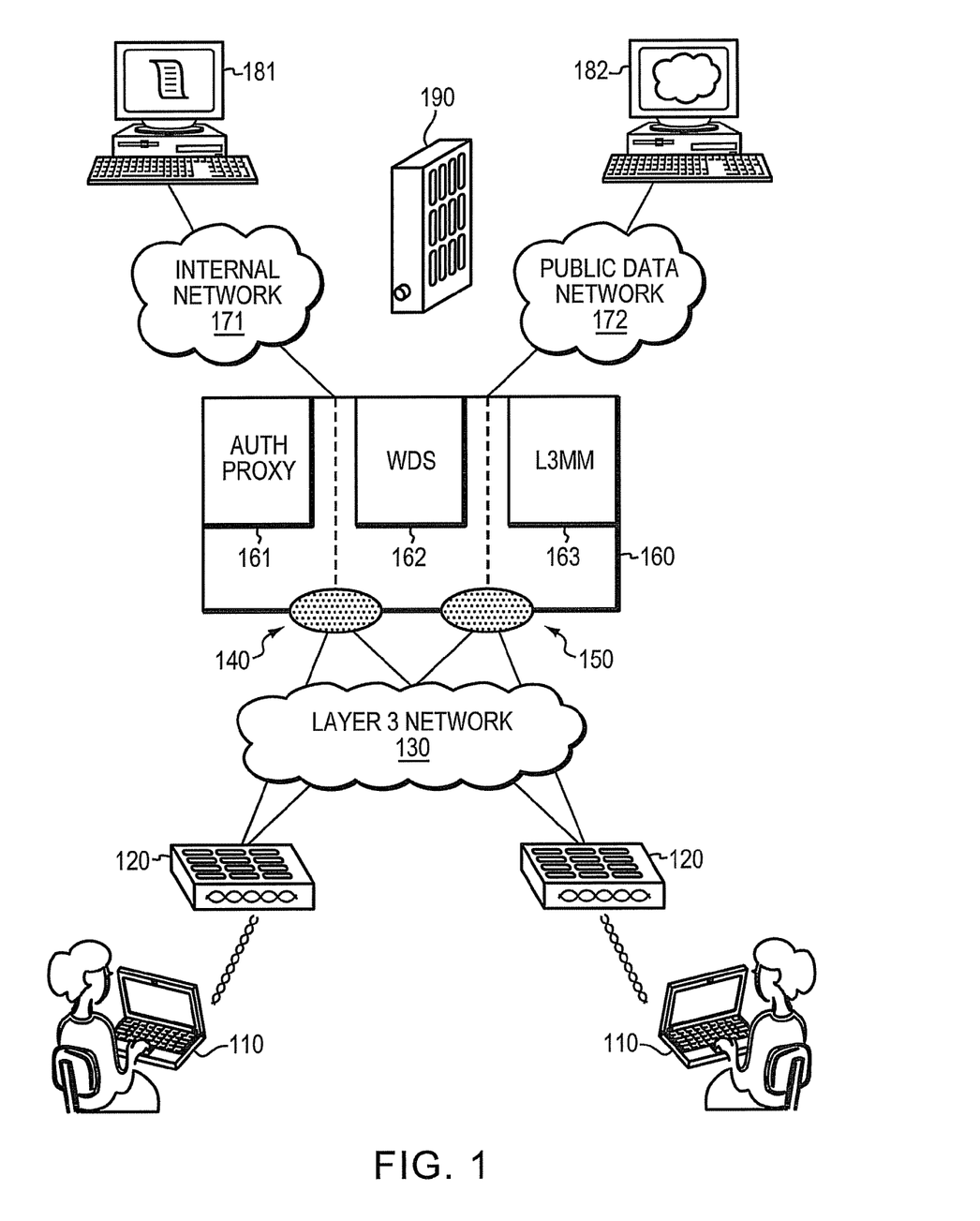
FIG. 1 illustrates an example system for providing guest access in wireless local area networks.

FIG. 1 illustrates an example system for providing guest access in wireless local area networks. Referring to FIG. 1, the wireless local area network (WLAN) 100 in particular embodiments may include a central switch 160 having a wireless LAN service module (WLSM) provided with wireless domain service (WDS) 162 residing thereon. Referring to FIG. 1, the central switch 160 may also includes layer-3 mobility module (L3MM) 163 and a HTTP based authentication proxy Server 161. In particular embodiments, the authentication proxy 161 may be configured on a restricted tunnel interface on the central switch 160 for enforcement and validation of user authentication, for example. In particular embodiments, the authentication proxy 161 may be configured to permit network administrators to apply specific security policies on a per user basis.

That is, in particular embodiments, appropriate ACL may be configured on the restricted tunnel interface 140 on the central switch 160 to block all client traffic except DHCP and DNS, and further, appropriate ACL may be further configured on a guest tunnel interface 150 on the central switch 160 to restrict the guest traffic in the sub-network that resides between a trusted internal network and an untrusted external network. Further, the authentication proxy, in particular embodiments, is enabled on the restricted tunnel interface 140 on the central switch 160.

When the authentication proxy 161 is enabled on an interface, for example, the first HTTP connection initiating from the configured interface may be intercepted after the input Access Control (ACL) check of the authentication cache database does not contain the corresponding entry for the data traffic initiating host. The authentication proxy 161 in particular embodiments may be configured to reply to the client host directly to solicit user name and password in an html page (web page), for example, and upon receipt of the user name and password from the user (e.g., mobile node), the authentication proxy authenticate the user with the AAA (Authentication, Authorization and Accounting) server. Upon successful completion of the authentication routine, the ACL item in the user profile defined in the AAA server database may be downloaded and applied to the interface, and a stateful authentication cache entry may be generated for the user to track the entire session. As discussed in further detail below, in the case of guest access feature, since the authenticated client's traffic will be moved to the guest tunnel from the restricted tunnel after authentication, there is no need to apply a per user dynamic ACL to the restricted tunnel.

Referring back to FIG. 1, the central switch 160 in particular embodiments may be operatively coupled to a layer 3 network 130, and include, for example, a restricted tunnel end point 140 and a guest tunnel end point 150. As discussed in further detail below, the restricted tunnel end point 140 may be configured for generic ACL applied to all users before authentication, and only allowing DNS and DHCP traffic. On the other hand, the guest tunnel end point 150 in particular embodiments may be configured for generic ACL applied to all users after authentication, and where any corporate or network administrator specific policy may be configured.

Referring again to FIG. 1, the wireless local area network may also include in particular embodiments access points (APs) 120 operatively coupled to one or more mobile nodes 110. While only two access points (APs) 120 and two mobile nodes 110 are shown in FIG. 1, within the scope of the present disclosure, there may be provided additional access points (for example, approximately 600 access points (APs) operatively coupled to the central switch 160, where each access point (AP) may in turn, be configured to support additional mobile nodes (MNs) (for example, approximately 6,000 mobile nodes (MNs).

Referring still again to FIG. 1, also shown are other data networks which may be operatively coupled to the central switch 160. For example, in particular embodiments central switch 160 may be operatively coupled to an internal network 171 supporting an authentication server 181, and where the internal network 171 may be separated from a public data network 172 by a firewall 190, and further, where the public data network 172 may be operatively coupled to one or more web servers 182.

In this manner, in particular embodiments, there may be provided two tunnels between the central switch 160 and the access points 120 reserved for each guest group—the restricted and guest tunnels. The restricted tunnel may be used to authenticate the guests, and the guest traffic may be directed to the guest tunnel after the authentication is completed. In particular embodiments, the guest tunnel may be configured to connect to a predefined IP subnet which may reside between a trusted internet network such as a corporate private LAN (e.g., internal network 171), and an untrusted external network, such as the public data network 172. Accordingly, by providing two tunnels for each guest group, the guest tunnel may be configured to forward data packets in hardware configuration, while the restricted tunnel may be configured to process switch packets even after the client devices are authenticated.

Figure 2:
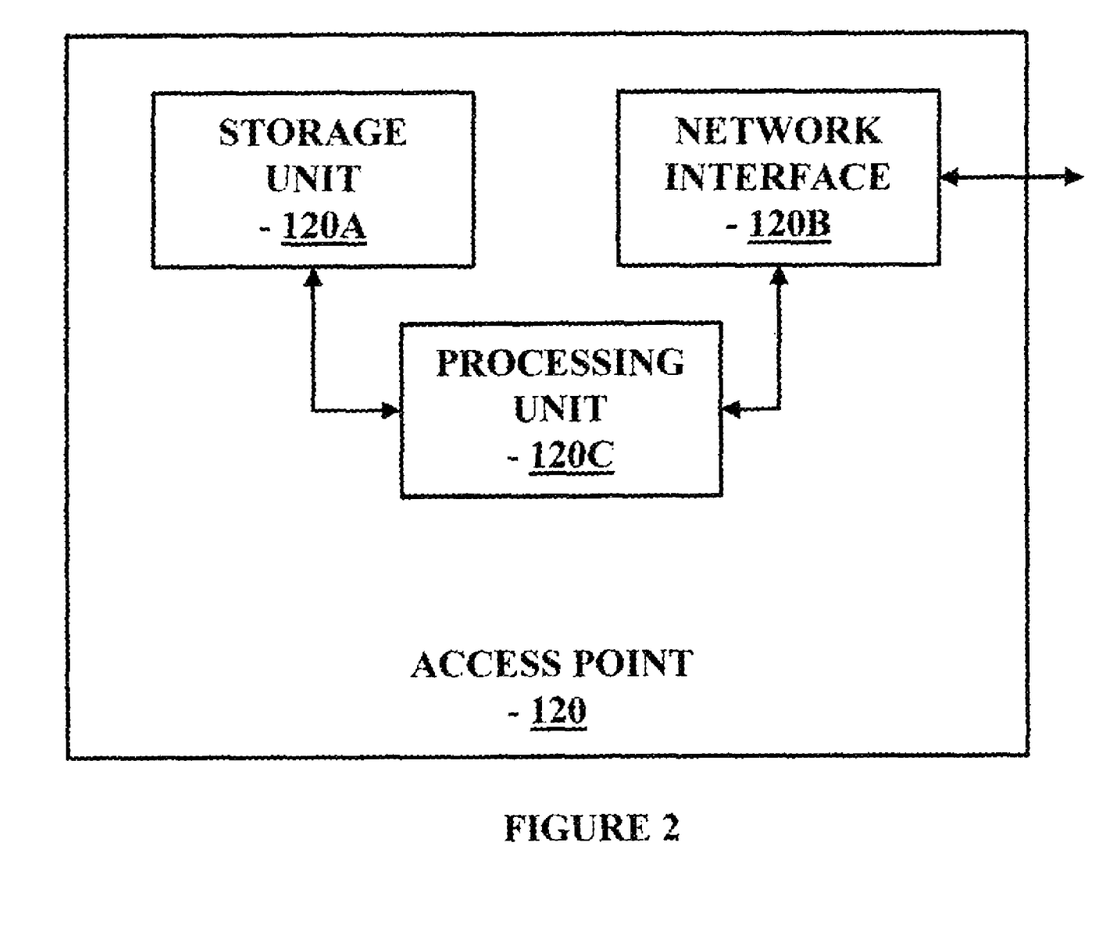
FIG. 2 illustrates an example network device in the system illustrated in FIG. 1.

FIG. 2 illustrates an example network device in the system illustrated in FIG. 1. Referring to FIG. 2, the network device such as the access point 120, for example, in particular embodiments may include a storage unit 120A operatively coupled to a processing unit 120C. In particular embodiments, the processing unit 120C may include one or more microprocessors for retrieving and/or storing data from the storage unit 120A, and further, for executing instructions stored in, for example, the storage unit 120A, for implementing one or more associated functions related to providing guest access in wireless local area networks. Referring again to FIG. 2, in one aspect, the access point 120 may include a network interface 120B which may be configured to interface with one or more of the mobile nodes 110, the layer 3 network 130, or the like (FIG. 1). In particular embodiments, the access point 120 may include a plurality of network interfaces including, for example, 802.11 radio interface, and 802.3 ethernet interface.

In particular embodiments, as discussed in further detail below, the memory or storage unit 120A of the access point 120 may be configured to store instructions which may be executed by the processing unit 120C to communicate with a central switch 160, for example, which may be configured to detect a wireless network access request, forward data associated with the detected wireless network access request to a first multipoint Generic Routing Encapsulation (mGRE) tunnel, receive authentication information associated with the detected wireless network access request, receive authentication status information for the detected wireless network access request, and forward data associated with the detected wireless network access request to a second multipoint Generic Routing Encapsulation (mGRE) tunnel connected to a predetermined internet protocol (IP) subnet when the received authentication status information includes a successful authentication.

Figure 3:
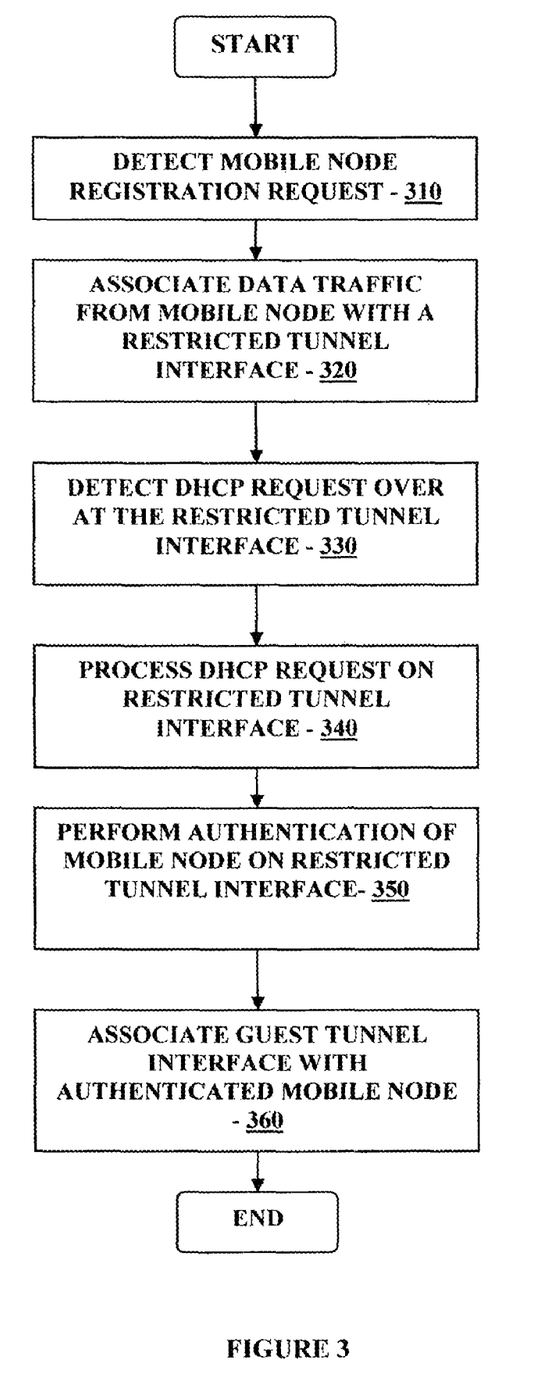
FIG. 3 illustrates an example method for providing wireless local area network (WLAN) guest access procedure.

FIG. 3 illustrates an example method for providing wireless local area network (WLAN) guest access procedure. Referring to FIG. 3, in particular embodiments, network device registration request is detected at step 310. For example, in particular embodiments, central switch 160 may be configured to detect the network device registration request of one or more mobile nodes (mobile clients or terminals) 110 from an access point 120 (FIG. 1).

Referring back to FIG. 3, when the network device registration request is detected, the network device is associated with a restricted tunnel interface at step 320. After associating the data traffic from the one or more mobile nodes with the restricted tunnel interface, when a DHCP request of the restricted tunnel interface is detected at step 330, the detected DHCP request on the restricted tunnel interface is processed at step 340. Thereafter at step 350, authentication of the one or more mobile nodes on the restricted tunnel interface is performed (such as, for example, the HTTP Auth Proxy Authentication). After authenticating the one or more mobile nodes on the restricted tunnel interface, the data traffic from the authenticated one or more mobile nodes is associated with a guest tunnel interface at step 360. In this manner, in particular embodiments, the restricted tunnel interface 140 may be used to authenticate the mobile nodes or wireless guests, and the guest traffic may be directed to the guest tunnel interface 150 after the authentication is completed.

Figure 4:
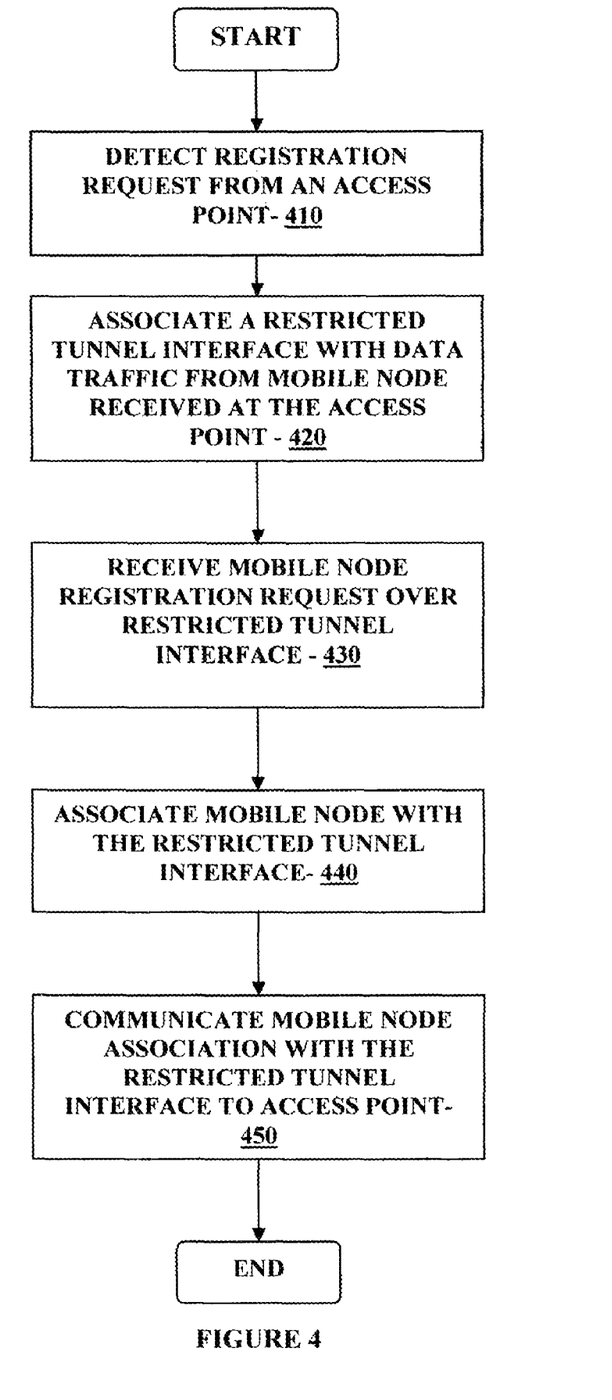
FIG. 4 illustrates an example method for detecting and performing network device association with access tunnel interface in the wireless local area network (WLAN) guest access procedure.

FIG. 4 illustrates an example method for detecting and performing network device association with tunnel interface in the wireless local area network (WLAN) guest access procedure. Referring to FIG. 4, in particular embodiments, at step 410, a registration request from an access point 120 (FIG. 1) is detected. Thereafter, a restricted tunnel interface is associated with the data traffic from one or more mobile nodes received at the access point 120 at step 420. After associating the restricted tunnel interface 140 with the access point 120, when mobile node 110 registration request is received over the restricted tunnel interface 140 at step 430, for example, by the central switch 160, the mobile node 110 is associated with the restricted tunnel interface 140 at step 440. Thereafter, the mobile node association with the restricted tunnel interface 140 is communicated to the access point 120 at step 450. In this manner, in particular embodiments, the detection of network device registration request and association of the network device with a restricted tunnel interface (steps 310-320) may be performed as described above in conjunction with FIG. 4.

Figure 5:
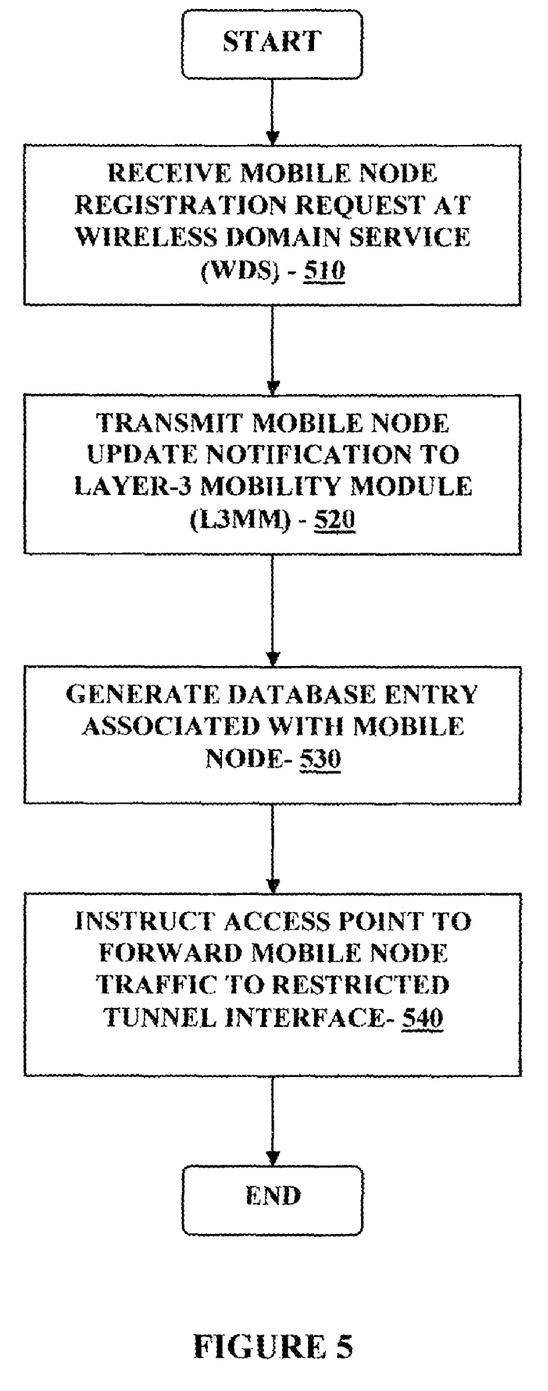
FIG. 5 illustrates an example method for associating mobile node with the restricted tunnel interface in the wireless local area network (WLAN) for guest access configuration.

FIG. 5 illustrates an example method for associating mobile node with the restricted tunnel interface in the wireless local area network (WLAN) for guest access configuration. More specifically, FIG. 5 illustrates associating mobile node with the restricted tunnel interface (step 440) of FIG. 4 in particular embodiments. Referring to FIG. 5, mobile node registration request at the wireless domain service (WDS) is received at step 510. Thereafter, mobile node update notification is transmitted to the Layer-3 mobility module (L3MM) at step 520, and a database entry associated with the mobile node is generated at step 530. Referring again to FIG. 5, after generating a database entry associated with the mobile node, an instruction command is generated and transmitted to the access point 120 (FIG. 1) to forward mobile node 110 traffic to the restricted tunnel interface 140 at step 540.

In other words, in particular embodiments, when the access point (AP) 120 sends the mobile node registration request to the WDS 162, and the WDS sends a mobile node update notification to L3MM 163, a new entry is generated in the L3MM database which includes mobile node MAC address, access point IP address, and guest network ID associated with the mobile node, for example. Thereafter, the central switch 160 may be configured to instruct the access point 120 to forward the mobile node 110 traffic to the restricted tunnel through the restricted tunnel interface 140.

Figure 6:
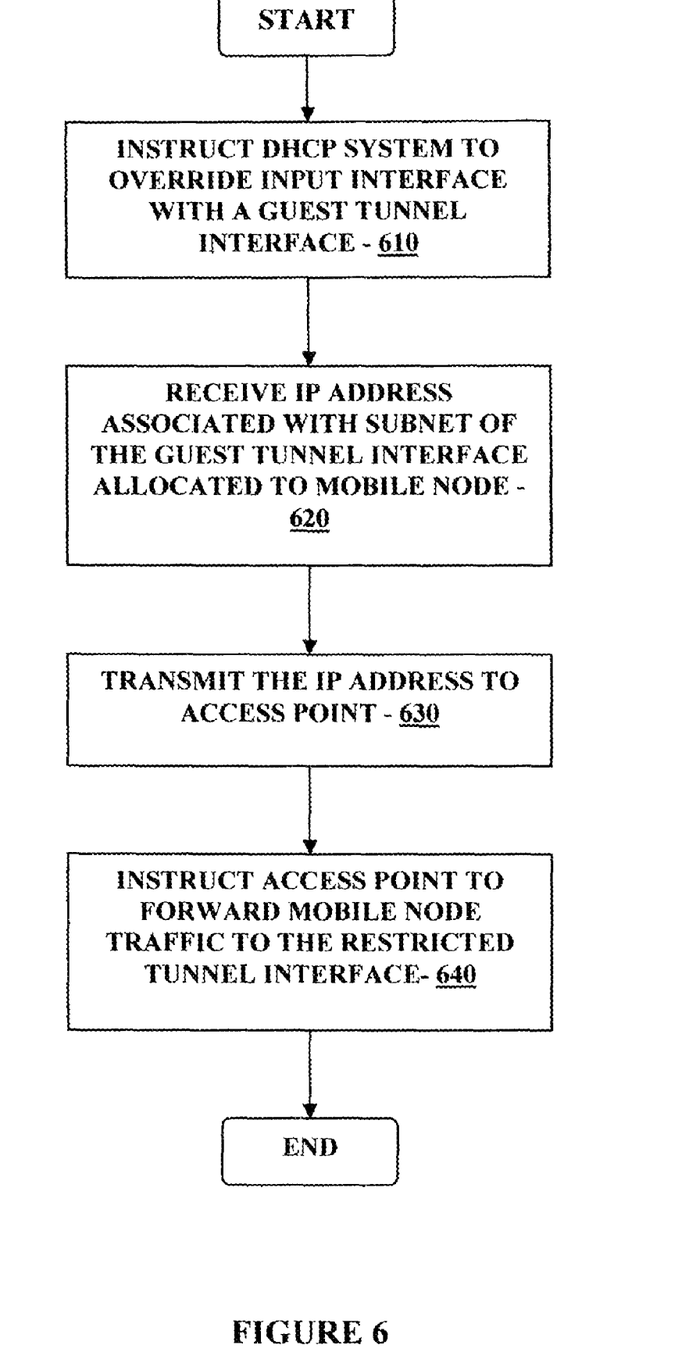
FIG. 6 illustrates an example method for processing DHCP request from mobile node in the wireless local area network (WLAN) for guest access configuration.

FIG. 6 illustrates an example method for processing DHCP request from mobile node in the wireless local area network (WLAN) for guest access configuration. More specifically, in particular embodiments, processing DHCP request on the restricted tunnel interface 340 (FIG. 3) is described in further detail. Referring to FIG. 6, at step 610, the DHCP system is instructed to override an input interface with a guest tunnel interface 150 (FIG. 1). Thereafter, at step 620, when an IP address associated with a subnet of the guest tunnel interface allocated to the mobile node is received, the IP address is transmitted to the access point 120 (FIG. 1) at step 630. After transmitting the IP address to the access point, at step 640, the access point is instructed or configured to forward mobile node traffic to the restricted tunnel interface.

More specifically, in particular embodiments, when the DHCP request is received by the central switch 160, the L3MM 162 may be configured to instruct the DHCP system to override the input interface with the guest tunnel interface 160 of the central switch 160, This provides the impression that the DHCP message came from the guest tunnel via the guest tunnel interface 160 rather than the restricted tunnel via the restricted tunnel interface 150. In this manner, the DHCP may be configured to allocate an IP address from the subnet of the guest tunnel to the client (mobile node). The DHCP snooping system in particular embodiments may detect the IP address allocated to the mobile node in the reply from the DHCP server, and communicate the information to the L3MM 162 of the central switch 160. The L3MM 162 in turn may be configured to report the mobile node's IP address to the access point 120 and instruct the local forwarding engine in the access point 120 to forward traffic to the mobile node's IP address to the restricted tunnel.

Figure 7:
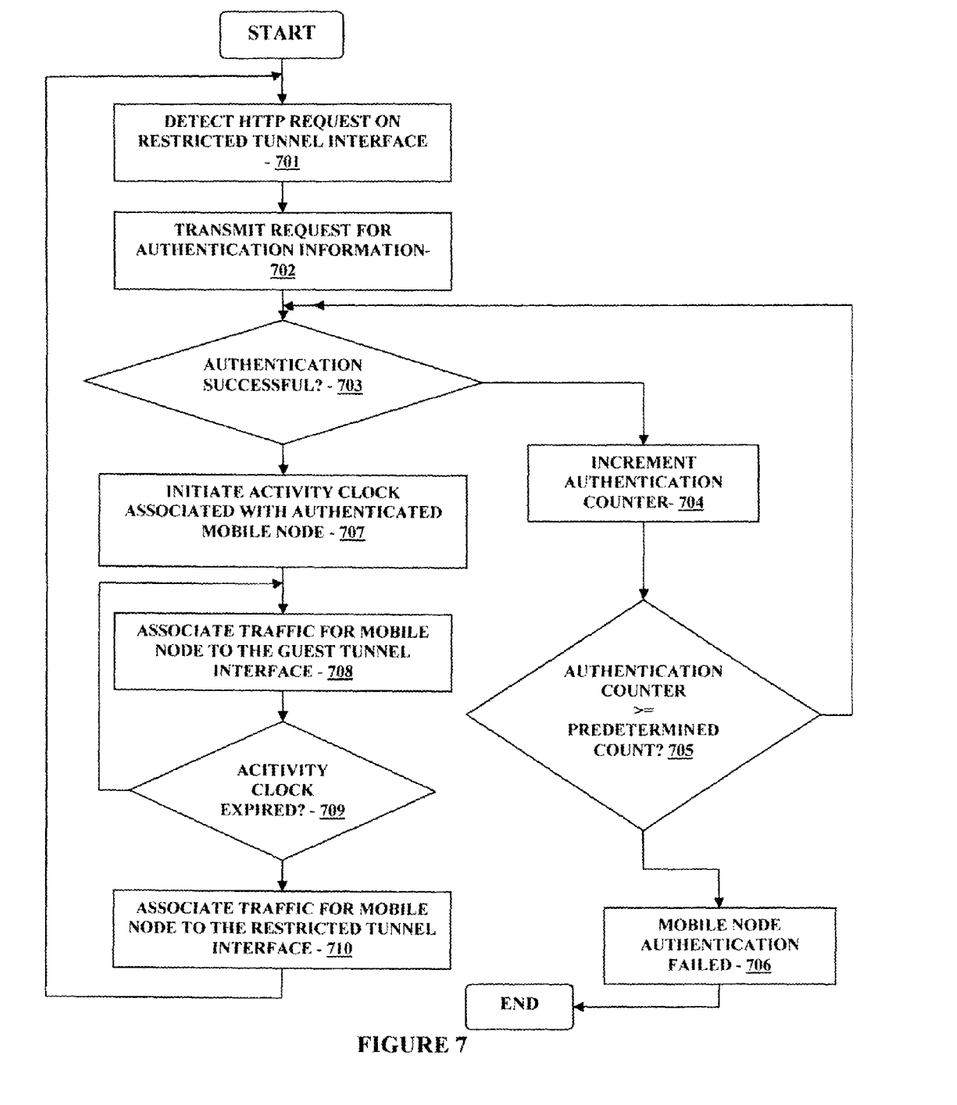
FIG. 7 illustrates an example method for performing authentication of the network device.

FIG. 7 illustrates an example method for performing authentication of the network device. More particularly, in particular embodiments, the authentication of the network device on the restricted tunnel interface (step 350) of FIG. 3 is described in further detail. Referring to FIG. 7, at step 701, in particular embodiments, central switch 160 (FIG. 1) may be configured to detect an http request on a restricted tunnel interface 140. When the http request (for example, from a mobile node 110) is detected on the restricted tunnel interface 140, at step 702, a request for authentication information is transmitted. For example, when a mobile node transmits an http request, the central switch 160 may be configured to intercept the transmitted http request and to redirect the mobile node data transmission to an authentication web page that prompts for the authentication information such as username and password. Upon receiving the authentication information from the mobile node, that information such as the username and passwords are subject to the authentication process by, for example, having verification performed by one or more of the authentication server such as the AAA (Authentication, Authorization and Accounting) server. Thereafter, at step 703, it is determined whether the authentication of the mobile node 110 (FIG. 1) is successful. That is, if at step 703 is it determined that the authentication is not successful, then at step 704 an authentication counter is incremented (for example, by one count or one), and thereafter, at step 705, it is determined whether the authentication counter has reached or exceeded a predetermined count. If at step 705 it is determined that the authentication counter has not reached or exceeded the predetermined count, then the routine returns to step 703 to determine again whether the authentication is successful. Referring back to FIG. 7, if at step 705 it is determined that the authentication counter has reached or exceeded the predetermined count, then at step 706, it is determined that the mobile node authentication has failed, and the routine terminates.

Referring again to FIG. 7, if at step 703 it is determined that the authentication of the mobile node 110 (FIG. 1) is successful, then at step 707, an activity clock associated with the authenticated mobile node is initiated, and thereafter, at step 708, traffic for the authenticated mobile node is associated to or with the guest tunnel interface 150 on the central switch 160. At step 709, it is determined whether the activity clock associated with the authenticated mobile node has expired. If it is determined that the activity clock associated with the authenticated mobile node has not expired at step 709, then the routine returns to step 708 and the traffic for the mobile node is continued to be associated with the guest tunnel interface 160. On the other hand, if at step 709 it is determined that the activity clock associated with the authenticated mobile node has expired, then at step 710, the traffic for the mobile node is associated to or with the restricted tunnel interface 140 on the central switch 160. Thereafter, the routine returns to the beginning where http request is monitored for detection.

That is, in particular embodiments, when the mobile node starts a web browser and enters a URL, the browser may need to send a DNS query through the restricted tunnel to obtain IP address of the web server (for example, web server 172 (FIG.

1)). The authentication proxy on the restricted tunnel interface 140 on the central switch 160 may be configured to intercept the http request from the mobile node. Since the mobile node 110 has not been previously authenticated, the authentication proxy may be configured to reply to the mobile node directly to solicit user name and password by an html page. Upon receipt of the user name and password from the client or mobile node 110, the authentication proxy may be configured to authenticate the user with an authentication server (for example, authentication server 181 (FIG. 1)). The user name and the password are then exchanged between the mobile node 110 and the central switch 160 through secure hypertext transfer protocol (https).

If the authentication fails, for example, a predetermined number of retry attempts may be offered to the mobile node before the authentication proxy times out on the user. If the mobile node 110 is authenticated, the authentication proxy may be configured to notify the L3MM 163 of the successful authentication and start inactivity and absolute timers for the client, for example. Furthermore, upon receipt of successful authentication notification, the L3MM 163 in particular embodiments may be configured to re-program the central switch 160 forwarding engine to route the traffic to the client's IP address to the guest tunnel via the guest tunnel interface 160, and further, to instruct the access point 120 to route the traffic from the mobile node 120 to the guest tunnel as well. In this manner, all of the mobile node 110's traffic travels to the sub-network that resides between a trusted internal network (such as a corporate private LAN or the internal network 171), and an untrusted external network such as the public data network 172) through the guest tunnel.

When the inactivity timer or absolute timer is triggered, in particular embodiments, authentication proxy may be configured to send an associated notification to the L3MM 163 which in turn, is configured to instruct the local forwarding engine and the access point 120 to route the mobile node 110's traffic through the restricted tunnel again. Further, when the mobile node 110 deregisters with the access point 120 (and with the WDS 162/L3MM 163), the L3MM 163 may be configured to remove the authentication proxy session for the deregistered mobile node 110 on the restricted tunnel interface 140 such that, when the mobile node returns, it will be authenticated again.

In the manner described, in particular embodiments, a predefined SSID for each guest group is provided. The guest SSID may be similar to other SSIDs and may be mapped to a network ID configured on access point 120. The restricted and guest tunnel interfaces 150, 160 may be configured on the central switch 160 for the network ID. The wireless mobility commands in particular embodiments may be configured on both mGRE tunnel interfaces on the router processor to associate the two tunnels. The access point 120 may be instructed by the central switch 160 as to which tunnel it should forward the traffic for a given mobile node 110. The guest wireless network in particular embodiments may be either trusted or untrusted. If the guest wireless network is untrusted, then only DHCP allocated IP addresses are considered acceptable. On the other hand, if the guest wireless network is considered to be trusted, then the user statically assigned IP addresses are in the IP subnet of the guest tunnel (otherwise the L3MM 163 will ignore the mobile node' registration request).

Appropriate ACL in particular embodiments is configured on the restricted tunnel interface 140 on the central switch 160 to block all client traffic except DHCP and DNS, and further, appropriate ACL is further configured on the guest tunnel interface 150 on the central switch 160 to restrict the guest traffic in the sub-network that resides between a trusted internal network and an untrusted external network. Further, the authentication proxy, in particular embodiments, is enabled on the restricted tunnel interface 140 on the central switch 160.

In this manner, in particular embodiments, there may be provided two tunnels between the central switch 160 and the access points 120 in wireless local area networks 100 (FIG. 1) reserved for each guest group—the restricted and guest tunnels. The restricted tunnel may be used to authenticate the guests, and the guest traffic may be directed to the guest tunnel after the authentication is completed. In particular embodiments, the guest tunnel may be configured to connect to a predefined IP subnet which may reside between a trusted internet network such as a corporate private LAN (e.g., internal network 171), and an untrusted external network, such as the public data network 172. Accordingly, by providing two tunnels for each guest group, the guest tunnel may be configured to forward data packets in hardware configuration, while the restricted tunnel 140 may be configured to process switch packets even after the client devices are authenticated.

In addition, within the scope of the present disclosure, the two tunnels including restricted and guest tunnels may be replaced with two virtual local area networks (VLANs) including, for example, a restricted VLAN and a gust VLAN. Moreover, within the scope of the present disclosure, the authentication mechanism described herein are for illustrative purposes only, and any other authentication mechanism such as secure socket layer (SSL) certificate based authentication, for example, may be used.

A method in particular embodiments may include detecting a wireless network access request, forwarding data associated with the detected wireless network access request to a first multipoint Generic Routing Encapsulation (mGRE) tunnel, receiving authentication information associated with the detected wireless network access request, receiving authentication status information for the detected wireless network access request, and forwarding data associated with the detected wireless network access request to a second multipoint Generic Routing Encapsulation (mGRE) tunnel connected to a predetermined internet protocol (IP) subnet when the received authentication status information includes a successful authentication.

In particular embodiments, the first mGRE tunnel may include a restricted tunnel and further, where the second mGRE tunnel may include a guest tunnel.

In particular embodiments, the predetermined IP subnet may be configured to reside between a trusted data network and an untrusted data network, and further, where the trusted data network may include an internal private local area network, and further, where the untrusted data network may include a public data network.

In particular embodiments, detecting the wireless network access request may include transmitting a network registration request associated with the access request, and further, which may include transmitting one or more of a MAC address, an IP address or a network identification information associated with the access request.

In particular embodiments, when the received authentication status information indicates a failed authentication, waiting a predetermined time period until successful authentication status information is received prior to forwarding data associated with the detected wireless network access request to the second mGRE tunnel.

In particular embodiments, the method may also include detecting a timeout period associated with the network access request.

In particular embodiments, the method may also include detecting a de-registration status associated with the network access request, and receiving an updated authentication status information associated with the wireless network access request indicating a failed authentication status.

An apparatus in particular embodiments may include a network interface, one or more processors coupled to the network interface, and a memory for storing instructions which, when executed by the one or more processors, causes the one or more processors to detect a wireless network access request, forward data associated with the detected wireless network access request to a first multipoint Generic Routing Encapsulation (mGRE) tunnel, receive authentication information associated with the detected wireless network access request, receive authentication status information for the detected wireless network access request, and forward data associated with the detected wireless network access request to a second multipoint Generic Routing Encapsulation (mGRE) tunnel connected to a predetermined internet protocol (IP) subnet when the received authentication status information includes a successful authentication.

In particular embodiments, the first mGRE tunnel may include a restricted tunnel and further, where the second mGRE tunnel may include a guest tunnel.

In particular embodiments, the predetermined IP subnet may be configured to reside between a trusted data network and an untrusted data network, where the trusted data network may include an internal private local area network, and further, where the untrusted data network may include a public data network.

In particular embodiments, the memory may be further configured for storing instructions which, when executed by the one or more processors, causes the one or more processors to transmit a network registration request associated with the access request, and further, where the memory may be further configured for storing instructions which, when executed by the one or more processors, causes the one or more processors to transmit one or more of a MAC address, an IP address or a network identification information associated with the access request.

In particular embodiments, when the received authentication status information indicates a failed authentication, the memory may be further configured for storing instructions which, when executed by the one or more processors, causes the one or more processors to wait a predetermined time period until successful authentication status information is received prior to forwarding data associated with the detected wireless network access request to the second mGRE tunnel.

In particular embodiments, the memory may be further configured for storing instructions which, when executed by the one or more processors, causes the one or more processors to detect a timeout period associated with the network access request.

In particular embodiments, the memory may be further configured for storing instructions which, when executed by the one or more processors, causes the one or more processors to detect a de-registration status associated with the network access request, and to receive an updated authentication status information associated with the wireless network access request indicating a failed authentication status.

An apparatus in particular embodiments may include means for detecting a wireless network access request, means for forwarding data associated with the detected wireless network access request to a first multipoint Generic Routing Encapsulation (mGRE) tunnel, means for receiving authentication information associated with the detected wireless network access request, means for receiving authentication status information for the detected wireless network access request, and means for forwarding data associated with the detected wireless network access request to a second multipoint Generic Routing Encapsulation (mGRE) tunnel connected to a predetermined internet protocol (IP) subnet when the received authentication status information includes a successful authentication.

The various processes described above including the processes performed by the central switch 160 or the access point 120 in the software application execution environment in the data network 100 including the processes and routines described in conjunction with FIGS. 3-7, may be embodied as computer programs developed using an object oriented language that allows the modeling of complex systems with modular objects to create abstractions that are representative of real world, physical objects and their interrelationships. The software required to carry out the inventive process, which may be stored in the memory of the central switch 160 or the access point 120 may be developed by a person of ordinary skill in the art and may include one or more computer program products.

Various other modifications and alterations in the structure and method of operation of the particular embodiments will be apparent to those skilled in the art without departing from the scope and spirit of the disclosure. Although the disclosure has been described in connection with specific particular embodiments, it should be understood that the disclosure as claimed should not be unduly limited to such particular embodiments. It is intended that the following claims define the scope of the present disclosure and that structures and methods within the scope of these claims and their equivalents be covered thereby.

What is claimed is:

1. A method, comprising:
   detecting a wireless network access request;
   forwarding data associated with the detected wireless network access request to a first multipoint Generic Routing Encapsulation (mGRE) tunnel;
   receiving authentication information associated with the detected wireless network access request;
   receiving authentication status information for the detected wireless network access request; and
   forwarding data associated with the detected wireless network access request to a second multipoint Generic Routing Encapsulation (mGRE) tunnel connected to a predetermined internet protocol (IP) subnet when the received authentication status information includes a successful authentication.

2. The method of claim 1 wherein the first mGRE tunnel includes a restricted tunnel and further, wherein the second mGRE tunnel includes a guest tunnel.

3. The method of claim 1 wherein the predetermined IP subnet is configured to reside between a trusted data network and an untrusted data network.

4. The method of claim 3 wherein the trusted data network includes an internal private local area network, and further, wherein the untrusted data network includes a public data network.

5. The method of claim 1 wherein, detecting the wireless network access request includes transmitting a network registration request associated with the access request.

6. The method of claim 5 further including transmitting one or more of a MAC address, an IP address or a network identification information associated with the access request.

7. The method of claim 1 wherein when the received authentication status information indicates a failed authentication, waiting a predetermined time period until successful authentication status information is received prior to forwarding data associated with the detected wireless network access request to the second mGRE tunnel.

8. The method of claim 1 further including detecting a timeout period associated with the network access request.

9. The method of claim 1 further including:
   detecting a de-registration status associated with the network access request; and
   receiving an updated authentication status information associated with the wireless network access request indicating a failed authentication status.

10. An apparatus, comprising:
    a network interface;
    one or more processors coupled to the network interface; and
    a memory for storing instructions which, when executed by the one or more processors, causes the one or more processors to detect a wireless network access request, forward data associated with the detected wireless network access request to a first multipoint Generic Routing Encapsulation (mGRE) tunnel, receive authentication information associated with the detected wireless network access request, receive authentication status information for the detected wireless network access request, and forward data associated with the detected wireless network access request to a second multipoint Generic Routing Encapsulation (mGRE) tunnel connected to a predetermined internet protocol (IP) subnet when the received authentication status information includes a successful authentication.

11. The apparatus of claim 10 wherein the first mGRE tunnel includes a restricted tunnel and further, wherein the second mGRE tunnel includes a guest tunnel.

12. The apparatus of claim 10 wherein the predetermined IP subnet is configured to reside between a trusted data network and an untrusted data network.

13. The apparatus of claim 12 wherein the trusted data network includes an internal private local area network, and further, wherein the untrusted data network includes a public data network.

14. The apparatus of claim 10 wherein the memory is further configured for storing instructions which, when executed by the one or more processors, causes the one or more processors to transmit a network registration request associated with the access request.

15. The apparatus of claim 14 wherein the memory is further configured for storing instructions which, when executed by the one or more processors, causes the one or more processors to transmit one or more of a MAC address, an IP address or a network identification information associated with the access request.

16. The apparatus of claim 10 wherein when the received authentication status information indicates a failed authentication, the memory is further configured for storing instructions which, when executed by the one or more processors, causes the one or more processors to wait a predetermined time period until successful authentication status information is received prior to forwarding data associated with the detected wireless network access request to the second mGRE tunnel.

17. The apparatus of claim 10 wherein the memory is further configured for storing instructions which, when executed by the one or more processors, causes the one or more processors to detect a timeout period associated with the network access request.

18. The apparatus of claim 10 wherein the memory is further configured for storing instructions which, when executed by the one or more processors, causes the one or more processors to detect a de-registration status associated with the network access request, and to receive an updated authentication status information associated with the wireless network access request indicating a failed authentication status.

19. An apparatus, comprising:
    means for detecting a wireless network access request;
    means for forwarding data associated with the detected wireless network access request to a first multipoint Generic Routing Encapsulation (mGRE) tunnel;
    means for receiving authentication information associated with the detected wireless network access request;
    means for receiving authentication status information for the detected wireless network access request; and
    means for forwarding data associated with the detected wireless network access request to a second multipoint Generic Routing Encapsulation (mGRE) tunnel connected to a predetermined internet protocol (IP) subnet when the received authentication status information includes a successful authentication.

* * * * *